US006922292B2

(12) United States Patent
Bos

(10) Patent No.: US 6,922,292 B2
(45) Date of Patent: Jul. 26, 2005

(54) WIDE ANGLE IMAGING SYSTEM

(75) Inventor: Brent J. Bos, Tucson, AZ (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 10/614,454

(22) Filed: Jul. 7, 2003

(65) Prior Publication Data

US 2004/0021956 A1 Feb. 5, 2004

Related U.S. Application Data

(62) Division of application No. 09/767,939, filed on Jan. 23, 2001, now Pat. No. 6,590,719, which is a division of application No. 09/361,814, filed on Jul. 27, 1999, now Pat. No. 6,201,642.

(51) Int. Cl.⁷ .............................................. G02B 13/04
(52) U.S. Cl. ........................ 359/753; 359/743; 348/118
(58) Field of Search ................................ 359/565, 742, 359/743, 749–753; 348/113, 118, 148

(56) References Cited

U.S. PATENT DOCUMENTS

| 3,947,095 A | 3/1976 | Moultrie ..................... 350/302 |
| 4,214,266 A | 7/1980 | Myers ......................... 358/108 |

(Continued)

FOREIGN PATENT DOCUMENTS

| DE | P2931368 A1 | 2/1981 | |
| DE | 3248511 A1 | 7/1984 | |
| EP | 0416222 A2 | 3/1991 | |
| EP | 0513476 A1 | 11/1992 | |
| FR | 2241085 | 4/1973 | |
| FR | 2585991 | 2/1987 | |
| FR | 2673499 | 9/1992 | |
| GB | 934037 | 8/1963 | ................. 358/108 |
| GB | 2137573 A | 10/1984 | |
| GB | 2244187 A | 11/1991 | |
| GB | 2327823 A | 2/1999 | |
| JP | 55039843 | 3/1980 | ................. 358/103 |
| JP | 58209635 | 12/1983 | |
| JP | 62122487 | 6/1987 | |
| JP | 62122844 | 6/1987 | ................. 358/108 |
| JP | 30061192 | 3/1991 | |
| JP | 50000638 | 1/1993 | |
| WO | 9638319 | 12/1996 | |

OTHER PUBLICATIONS

Hamit, Francis "360–Degree Interactivity: New Video and Still Cameras Provide a Global Roaming Viewpoint", *Advanced Imaging*, Mar. 1997, p. 50.

Johannes, Laura "A New Microchip Ushers in Cheaper Digital Cameras", *The Wall Street Journal*, Aug. 21, 1998, p. B1.

Commonly assigned, co–pending U.S. Appl. No. 09/199,907, filed Nov. 25, 1998, by Bos et al., entitled Wide Angle Image Capture System for Vehicle.

Primary Examiner—Mark A. Robinson
Assistant Examiner—Alessandro Amari
(74) Attorney, Agent, or Firm—Van Dyke, Gardner, Linn & Burkhart, LLP

(57) ABSTRACT

A wide angle imaging system for providing a wide angle field of view of an area exteriorly of a vehicle includes an image capture device having a field of view directed exteriorly of the vehicle, an outer wide angle lens, a focusing lens and a display. The image capture device may comprise an array of pixels and may have a coarse distribution of pixels and a fine distribution of pixels. The display may be operable to display a substantially undistorted image to the driver or occupant of the vehicle in response to a signal output of the image capture device.

43 Claims, 3 Drawing Sheets

U.S. PATENT DOCUMENTS

| | | | | |
|---|---|---|---|---|
| 4,277,804 A | | 7/1981 | Robison | 358/108 |
| 4,381,888 A | | 5/1983 | Momiyama | 350/458 |
| 4,626,850 A | | 12/1986 | Chey | 340/903 |
| 4,647,161 A | | 3/1987 | Muller | 350/462 |
| 4,892,345 A | | 1/1990 | Rachael, III | 296/24.1 |
| 4,895,790 A | | 1/1990 | Swanson et al. | 430/321 |
| 4,937,796 A | | 6/1990 | Tendler | 367/116 |
| 5,016,977 A | | 5/1991 | Baude et al. | 350/162.17 |
| 5,044,706 A | * | 9/1991 | Chen | 359/357 |
| 5,121,200 A | | 6/1992 | Choi | 358/103 |
| 5,208,701 A | | 5/1993 | Maeda | 359/574 |
| 5,406,395 A | | 4/1995 | Wilson et al. | 359/15 |
| 5,414,461 A | | 5/1995 | Kishi et al. | 348/115 |
| 5,574,443 A | | 11/1996 | Hsieh | 340/901 |
| 5,648,835 A | | 7/1997 | Uzawa | 396/429 |
| 5,670,935 A | | 9/1997 | Schofield et al. | 340/461 |
| 5,737,125 A | | 4/1998 | Ohashi | 359/565 |
| 5,760,826 A | | 6/1998 | Nayar | 348/36 |
| 5,760,828 A | | 6/1998 | Cortes | 348/143 |
| 5,796,094 A | | 8/1998 | Schofield et al. | 250/208.1 |
| 5,818,527 A | * | 10/1998 | Yamaguchi et al. | 348/335 |
| 5,880,879 A | * | 3/1999 | Foo | 359/356 |
| 5,949,331 A | | 9/1999 | Schofield et al. | 340/461 |
| 5,982,544 A | | 11/1999 | Ogata | 359/565 |
| 6,018,425 A | | 1/2000 | Nakabayashi et al. | 359/753 |
| 6,028,711 A | | 2/2000 | Adachi | 359/642 |
| 6,201,642 B1 | | 3/2001 | Bos | 359/565 |
| 6,498,620 B2 | | 12/2002 | Schofield et al. | 348/148 |
| 6,538,691 B1 | * | 3/2003 | Macy et al. | 348/222.1 |

* cited by examiner

WIDE ANGLE IMAGING SYSTEM

The present application is a division of U.S. patent application, Ser. No. 09/767,939, filed Jan. 23, 2001 by Bos for WIDE ANGLE IMAGING SYSTEM, now U.S. Pat. No. 6,590,719, which is a division of U.S. patent application, Ser. No. 09/361,814, filed Jul. 27, 1999, by Bos for WIDE ANGLE IMAGING SYSTEM, now U.S. Pat. No. 6,201,642, which are hereby incorporated herein by reference in their entireties.

BACKGROUND OF THE INVENTION

This invention relates generally to vision systems, particularly for vehicles which provide a vehicle operator with wide angle scenic information of an area immediately around the vehicle. While the invention is illustrated in a rear-view vision system, it may be applied to other viewing directions, as well as to non-vehicular applications.

A long felt need in the art of vehicle vision systems, such as rear-view systems, has been to provide an operator of a vehicle with wide angle scenic information of an area around the vehicle, such as directly rearward of the vehicle, when the vehicle is traveling in reverse. Neither interior rear-view mirrors nor side exterior mirrors allow for visibility of the area immediately rearward of the vehicle's bumper, which is the information most critical to the vehicle operator when backing up. Therefore, various camera-based rear view vision systems have been proposed to provide visibility of this blind spot.

Various camera-based rear vision systems for vehicles backing up have been proposed. In one form of these systems, a camera with a conventional, standard lens is located on the rearward portion of the vehicle to provide a view of the area behind the vehicle. However, standard lenses fail to capture a wide angle view of the area, thus failing to provide the vehicle operator with an image of the entire critical area directly rearward of the vehicle.

In order to provide a wider angle view of the rearward area, a wide angle lens system may be used with the camera to capture the critical area. However, because the wide angle lens elements are typically precision optics, not only is the initial cost to manufacture and implement them very high, but so is the cost to replace them, should they be damaged or broken on the vehicle in the vulnerable area in which they are typically located.

Another difficulty with the proposed multi-element glass lens and camera systems is that they are difficult to package within the small area available at the rearward portion of the vehicle. These systems may comprise ten or more precision optic lens elements and are thus assembled as a long, horizontally oriented cylindrical column, which is then positioned within the trunk lid or a rear panel of the vehicle. This results in the camera system protruding substantially forwardly into the trunk space. Generally, it is desirable to minimize intrusion into the trunk space, such that the overall trunk space is maximized. This is desirable not only because trunk space is considered valuable to consumers, but also because consumers tend to over-pack their trunk spaces, and then force the trunk lid closed, which may result in damage to any components trapped between the packed items and the trunk lid. This is an even greater concern with the proposed multi-element glass lens systems, since the many optic elements may be fragile and thus prone to breaking. In a van, pick-up truck or the like, the long, cylindrical column of these camera systems would extend forward into an open space, and be more prone to damage.

SUMMARY OF THE INVENTION

The present invention is directed toward enhancing exterior visibility to the driver of a vehicle by providing an imaging system, which provides a wide angle field of view of the area directly exteriorly of a vehicle, that is compact, durable and inexpensive to manufacture. The imaging system of the present invention is capable of being compactly packaged within a portion of the vehicle and requires a minimal number of elements in order to minimize the size, cost and weight of the system.

According to an aspect of the present invention, a vehicular vision system provides scenic information of an area around of a vehicle. The vision system comprises a focusing lens having a receiving end and a focusing end, a wide angle lens positioned at the receiving end of the focusing lens and an image capture device which is adapted to receive an image refracted through the focusing lens group. The wide angle lens includes an outer negative optic and an inner negative optic positioned between the outer negative optic and the receiving end of the focusing lens. The wide angle lens further includes a diffractive element. The wide angle lens directs a virtual image of a wide angle field of view of a scene exteriorly of the vehicle toward the receiving end of the focusing lens. The virtual image of the wide angle field of view is focused by the focusing lens onto the image capture device.

In one form, the wide angle lens elements are formed from one of polycarbonate, acrylic and crown glass materials. The focusing lens preferably also comprises optic elements formed from one of polycarbonate and acrylic materials.

According to another aspect of the present invention, a vehicular vision system for providing scenic information of an area exteriorly of a vehicle comprises a focusing lens, a wide angle lens, an image capture device and a display system. The focusing lens includes a first focusing optic, a middle focusing optic and a third focusing optic, wherein the middle focusing optic is positioned along an optic path between the first and third focusing optics. The wide angle lens directs a virtual image of a wide angle field view of a scene exteriorly of the vehicle toward the focusing lens. The wide angle lens has an outer wide angle optic and an inner wide angle optic, where the outer wide angle optic is positioned toward an exterior of the vehicle and the inner wide angle optic is positioned along the optic path between the outer wide angle optic and the focusing lens. The image capture device is adapted to receive an image refracted through the focusing lens, such that the virtual image of the wide angle field of view is focused by the focusing lens onto the image capture device. The display system then displays an image in response to an output of the image capture device. Preferably, the focusing lens comprises one of polycarbonate and acrylic, while the wide angle lens comprises at least one of polycarbonate, acrylic and crown glass.

Therefore, the present invention includes a minimal number of optic elements and may be packaged within the small space constraints of the trunk of a vehicle. The invention is much less costly to manufacture over conventional systems due to the number of plastic components, such as polycarbonate and/or acrylic components. In this manner, the present invention provides a low cost and compact system which produces a maximum field of view to the vehicle operator.

These and other objects, advantages, purposes, and features of this invention will become apparent upon review of the following specification in conjunction with drawings.

BRIEF DESCRIPTION OF THE DRAWINGS

FIG. 5 is a schematic of the coordinate system corresponding to the equations which define the lens elements of the present invention.

DESCRIPTION OF THE PREFERRED EMBODIMENTS

Figure 2:
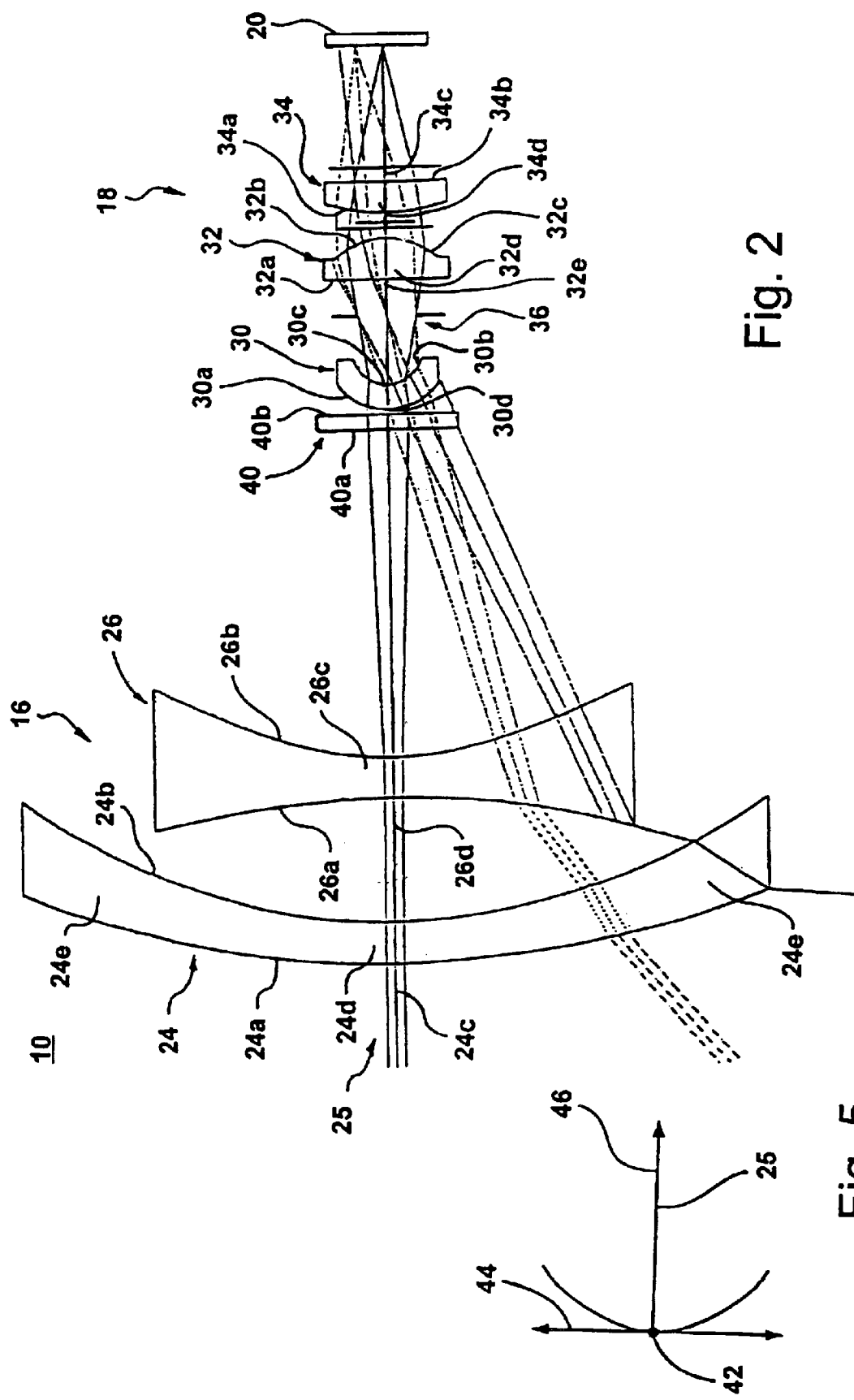
FIG. 2 is a cross-sectional view of the lenses of the present invention along the line II—II in FIG. 1.

Referring now to the drawings and the illustrative embodiments depicted therein, a wide angle imaging system, generally illustrated at 10, provides an operator of a vehicle 12 with scenic information of an area immediately exteriorly, such as rearwardly, of vehicle 12, which may be an automobile, a light truck, a van, a large truck, a sport utility vehicle or the like. As shown in FIG. 2, wide angle imaging system 10 includes a negative or diverging group of optic elements or wide angle lens 16, a positive or converging group of optic elements or focusing lens 18 and an image capture device 20. Wide angle group of optics 16 provides a virtual image of a wide angle field of view of a scene exteriorly of vehicle 12 toward a receiving end 18a of focusing lens 18. Image capture device 20 is positioned at a focusing end 18b of focusing lens 18. Focusing lens 18 receives the wide angle virtual image from wide angle group of optics 16 and focuses the image onto image capture device 20. As the image is received by image capture device 20, the image may be electronically communicated to a display screen 22 located within vehicle 12, where the image may be displayed for the vehicle operator. Alternately, an output of image capture device 20 may be provided to a control (not shown) for controlling an accessory of vehicle 12, such as headlamps, windshield wipers or the like.

Preferably, wide angle lens 16 and focusing lens 18 of the present invention provide a rearward or exteriorly directed image to display 22 similar to the image provided by the wide angle image capture system disclosed in commonly assigned U.S. patent application, Ser. No. 09/199,907, filed on Nov. 25, 1998, by Brent J. Bos et al., now U.S. Pat. No. 6,717,610, the disclosure of which is hereby incorporated herein by reference. The present invention is also useful in other vehicular vision systems of the type disclosed in commonly assigned U.S. Pat. Nos. 5,550,677 and 5,670,935, issued to Schofield et al., or rearview vision systems of the type disclosed in commonly assigned U.S. patent application, Ser. No. 08/921,160, filed Aug. 29, 1997, by Brent J. Bos, now U.S. Pat. No. 5,914,815, the disclosures of which are hereby incorporated herein by reference. It is further envisioned that the lenses of the present invention may also be useful in other vehicular or non-vehicular systems which include an image capture device. For example, wide angle imaging system 10 may be implemented in a vehicle headlamp dimmer control, preferably of the type disclosed in commonly assigned U.S. Pat. No. 5,796,094 issued to Schofield et al., a rain sensor, preferably of the type disclosed in commonly assigned PCT application, International Publication No. WO 99/23828, published May 14, 1999, the disclosure of which is hereby incorporated herein by reference, or other vehicular or even non-vehicular vision or control systems.

Wide angle lens 16 preferably includes an outer meniscus optic element 24 and a second inner optic element 26. Outer optic 24 is a diverging or negative element such that a virtual image of the wide angle field of view exteriorly of the vehicle is refracted through outer optic 24 toward inner optic 26. Preferably, the wide angle field of view provides a field of view angle of approximately 170°. This allows the wide angle field of view to include a body reference associated with the vehicle, such as a portion of the vehicle bumper 14 or the like.

Outer optic 24 is a generally curved, negative element which preferably has a diameter in a range of approximately 26.5 mm to 38.5 mm and a thickness of between 1.0 mm and 6.0 mm at a center axis 24c. Most preferably, outer optic 24 has a diameter of approximately 34.38 mm and a thickness of approximately 2.0 mm. Outer optic 24 is curved toward the exterior scene such that an outer surface 24a has a radius of curvature within a range of approximately 40 mm to 700 mm, while an inner surface 24b has a radius of curvature within a range of approximately 20 mm to 40 mm. Most preferably, the radius of curvature on outer surface 24a is approximately 95.6736 mm and the radius of curvature of inner surface 24b is approximately 30.00 mm. Outer optic 24 is preferably molded from a polycarbonate or acrylic material, but may be alternately formed from a crown glass material or the like for improved durability, without affecting the scope of the present invention.

Inner optic 26 is positioned substantially adjacent to and coaxially inward of inner surface 24b of outer optic 24 along an optic path 25 between outer optic 24 and image capture device 20. Inner optic 26 is also preferably formed from a plastic material such as polycarbonate, acrylic or the like. Inner optic 26 preferably includes a diffractive element such as a diffractive grating or diffractive surface on or adjacent to its outer surface 26a. The diffractive element corrects for color in the refracted virtual image, including spherochromatism and chromatic aberrations generated as the image is refracted through outer optic 24. Diffractive element 26a may vary depending on the material selected for inner element 26. For example, if inner element 26 is formed of a glass material, then the diffractive element or surface may not be necessary. However, additional glass or plastic elements may then be necessary to compensate for the lack of image correction by the glass element.

Preferably, inner optic 26 has oppositely curved surfaces, such that an inner surface 26b of inner element 26 is an outwardly curving hyperbolic, aspheric surface, while the diffractive element on outer surface 26a is curved inwardly toward inner surface 26b. Accordingly, inner element 26 is narrow in a middle region 26c at a center axis 26d and thickens radially outwardly therefrom. The virtual image which is refracted through outer optic 24 then further refracts through inner negative element 26, such that it diverges as it approaches focusing lens 18. Preferably, inner element 26 is approximately 1.0 mm to 6.0 mm thick at its narrow middle or center region 26c and has a clear effective diameter of approximately 20 mm to 28 mm. Most preferably, the thickness of inner element 26 is approximately 2.0 mm and the diameter is approximately 22.50 mm.

Inner surface 26b is preferably curved outwardly, opposite to diffractive surface 26a, and preferably has a radius of curvature between approximately 5 mm and 30 mm. Most preferably, the radius of curvature of inner surface 26b is approximately 23.3399 mm. Preferably, inner surface 26b is aspheric and has a surface defined by the following equation:

$$z = \frac{cy^2}{1+\sqrt{1-(1+K)c^2y^2}}; c = \frac{1}{r_{xy}}; \quad (1)$$

where x, y and z are coordinates on the inner surface 26b along an x-axis 42, a y-axis 44 and a z-axis 46, respectively, as shown in FIG. 5, $r_{xy}$ is the radius of curvature to each point on the surface corresponding to an x coordinate and a y coordinate, where y is the height above the center or optical axis 26d, and K is a conic constant. Preferably, K is selected to be within a range of approximately −1 to −20 and, most preferably, K is approximately −13.3619.

Outer diffractive element or surface 26a is oppositely curved from inner surface 26b and preferably has a radius of curvature within a range of approximately 20 mm to 60 mm. Most preferably, the radius of curvature of outer diffractive element 26a is approximately 35.3824 mm. The diffractive element functions to alter the phase of lightwaves that pass therethrough. Preferably, diffractive element 26a adds a phase (Φ) to the lightwaves according to the following equation:

$$\Phi = A_1\rho^2 + A_2\rho^4; \quad (2)$$

where ρ is a radial aperture coordinate divided by 1 mm and $A_1$ and $A_2$ are constants. Preferably $A_1$ is within a range of approximately 15 to 55 and $A_2$ is within a range of approximately −0.01 to −0.5. Most preferably, $A_1$ is approximately 47.4149 and $A_2$ is approximately −0.1463.

Inner optic 26 is preferably a plastic element, such as acrylic or polycarbonate, to facilitate forming the diffractive element 26a thereon in a cost-effective manner, since the diffractive pattern may be molded onto the surface as the optic element is formed. For example, the diffractive element may be formed by using the principles disclosed in commonly assigned U.S. Pat. No. 5,538,674, issued to Nisper, the disclosure of which is hereby incorporated herein by reference. This provides a low cost yet effective means to correct the color aberrations in the refracted image. The hyperbolic aspheric surface 26b is preferably included to further correct for distortions and aberrations within the refracted image from outer optic 24, such that the image passes therethrough and is refracted in varying degrees, preferably corresponding to the magnitude of distortion in the image received by inner optic 26.

Preferably, wide angle lens 16 is assembled as a unit and is adaptable for use with a separate focusing lens unit. As assembled, inner wide angle optic 26 is preferably spaced inwardly along optic path 25 from outer optic 24 such that outer surface 26a is spaced from inner surface 24b by approximately 4 mm to 10 mm. Most preferably, these optics 24 and 26 are separated along their axes 24c and 26d by approximately 6.000 mm along optic path 25. The assembled unit may then be secured to or adjacent to receiving end 18a of focusing lens 18 in a conventional manner.

Focusing lens 18 is positioned inwardly of negative or wide angle lens 16, such that focusing lens 18 is positioned along optic path 25 between inner negative optic 26 and image capture device 20 and within a panel or other exterior structure of vehicle 12. Focusing lens 18 receives the image refracted through wide angle lens 16 and focuses a focused image onto image capture device 20. Preferably, the present invention includes a positive or focusing group of lenses which are commercially available as a set or triplet of plastic lenses such as acrylic lenses.

For example, a three element lens useful with the present invention is available as an assembled unit and manufactured and marketed as an EL Series of lenses by Applied Image Group/Optics based in Tucson, Ariz. Focusing lens 18 preferably includes three optic elements: an outer focusing element 30, a middle focusing element 32 and an inner focusing element 34. Together these three optics are known in the art and are available as a plastic triplet. Most preferably, the elements of focusing lens 18 are formed from an acrylic or polycarbonate material.

Although commercially available as an assembled unit, the following briefly discusses the preferred specifications for each optic element within focusing lens 18. Outer focusing element or optic 30 is a negative or diverging optic positioned at receiving end 18a of focusing lens 18 and is generally C-shaped or convexly curved toward wide angle lens 16. Outer focusing element 30 includes a curved, elliptical and aspheric surface on an inner surface 30b and a curved outer surface 30a, which has a radius of curvature that is larger than a radius of curvature of inner surface 30b. Most preferably, the radius of curvature of outer surface 20a is approximately 3.0730 mm, while the radius of curvature of inner surface 30b is approximately 1.600 mm. Preferably, inner surface 30b is aspheric and defined by equation (1) above, with the conic constant K equal to approximately −0.2723. The thickness of outer focusing optic 30 is preferably approximately 1.2 mm through a center region 30c along a center axis 30d. Outer element 30 receives the refracted virtual image from wide angle lens 16 and functions to partially correct the image as the image is refracted and inverted through outer element 30 and toward middle element 32.

Middle focusing element 32 is a positive or converging optic and receives an inverted image from outer element 30 and refracts the image to further correct for distortions and aberrations within the image. Outer surface 32a of middle element 32 is preferably slightly curved toward outer element 30, while an inner surface 32b includes an oppositely curved surface with an elliptical aspheric portion 32c thereon. Preferably, outer surface 32a has a radius of curvature of approximately 166.3208 mm, while the aspheric portion 32c of inner surface 32b is oppositely curved with a radius of curvature of approximately 3.5109 mm. The aspheric portion 32c is preferably further defined by equation (1) above, with K equal to approximately −0.5270. The thickness of middle optic 32 is preferably approximately 2.0 mm through a center region 32d generally along its optic axis 32e. Middle element 32 refracts and directs the image toward inner element 34.

Preferably, an aperture stop 36 is positioned between outer element 30 and middle element 32. Aperture stop 36 provides an opening for the light rays to pass through and is preferably between approximately 1.0 mm and 5.0 mm in diameter. Most preferably, the diameter of the aperture stop opening is between approximately 2.0 mm and 2.5 mm. Aperture stop 36 functions to restrict the amount of light rays, which represent the image to be received by image capture device 20, which pass from outer focusing element 30 to middle focusing element 32. By providing a wider aperture, the image brightness and definition may be increased, while the depth of field and contrast of the image are correspondingly decreased. The aperture size may be selected according to the specific application and desired output of wide angle imaging system 10. Furthermore, the precise location of aperture stop 36 may be adjusted according to the specific application. Preferably, aperture stop 36 is positioned approximately 3.374 mm inwardly along optic path 25 from inner surface 30b of outer element 30 and approximately 1.770 mm outwardly from outer surface 32a of middle element 32.

Inner focusing element or optic 34 is also a positive optic and receives the image from middle element 32 and directs the image towards a focusing plane which corresponds to image capture device 20. Inner element 34 preferably includes an outwardly curved outer surface 34a which has a diffractive element thereon oriented toward middle element 32 and a slightly outwardly curved aspheric surface on its opposite inner surface 34b. This allows inner element 34 to further correct for color and to further converge and focus the image onto image capture device 20.

Preferably, outer surface 34a of inner focusing optic 34 has a radius of curvature of approximately 9.3651 mm. The diffractive element on outer surface 34a preferably alters the phase (M) of the lightwaves as defined by equation (2) above. Preferably, the constants $A_1$ and $A_2$ are selected for outer surface 34a such that $A_1$ is equal to approximately −71.9397 and $A_2$ is equal to approximately −0.3594.

Inner surface 34b is curved in the same direction as outer surface 34a and preferably has a radius of curvature of approximately 809.8961 mm. Inner surface 34b is an even aspheric surface which is preferably defined by the following equation:

$$z = \frac{cy^2}{1 + \sqrt{1 - (1+K)c^2 y^2}} + \alpha y^4; \; c = \frac{1}{r_{xy}}; \quad (3)$$

where x, y and z are coordinates on the inner surface 34b along an x-axis 42, a y-axis 44 and a z-axis 46, respectively, as shown in FIG. 5, $r_{xy}$ is the radius of curvature to each point on the surface corresponding to an x coordinate and a y coordinate, where y is the height above an optical axis 34c of inner focusing optic 34, α is a constant and K is a conic constant. Preferably, α is selected to be approximately 0.0006 and K is equal to approximately zero. The thickness of inner focusing optic 34 is preferably 1.5 mm through a center region 34d.

Preferably, focusing lens 18 is assembled as a unit such that an inner surface 30b of outer optic 30 is positioned outwardly, and approximately 5.144 mm, from outer surface 32a of middle optic 32 along their optic axes 30d and 32e, respectively. Aperture stop 36 is preferably positioned between outer optic 30 and middle optic 32 as discussed above. Inner focusing optic 34 is positioned inwardly from middle optic 32 such that inner surface 32b of middle optic 32 and outer surface 34a of inner optic 34 are separated by approximately 1.247 mm along their optic axes 32e and 34c, respectively.

Optionally, an optical filter 40 may be included at or substantially adjacent to receiving end 18a of focusing lens 18. The optical filter 40 is preferably provided to filter out infrared and/or near infrared rays of light which may otherwise be received by image capture device 20. Optical filter 40 thus functions to improve the color in the image provided by image capture device 20 to display 22. Optical filter 40 is preferred if image capture device 20 is a color camera or sensor, such as a CMOS or CCD sensor, which includes silicon sensors capable of sensing infrared light. In cases where optical filter 40 is included in wide angle imaging system 10, adjustments may be made to the positioning and shape of the other elements in order to correct for any aberrations which may be introduced by optical filter 40. Preferably, optical filter 40 has substantially flat outer and inner surfaces 40a and 40b, respectively, and is approximately 0.7 mm thick. Optical filter 40 is preferably formed from a glass material such as BK7 glass. Inner surface 40b of optical filter 40 is preferably spaced along optic path 25 approximately 0.25 mm from outer surface 30a of outer focusing optic 30. Alternately, optical filter 40 may be an adjustable electro-optic filter of the type disclosed in commonly assigned U.S. provisional patent application, Ser. No. 60/135,657, filed May 24, 1999, by Mark L. Larson and Brent J. Bos, the disclosure of which is hereby incorporated herein by reference.

When imaging system 10 is assembled and implemented on vehicle 12, outer wide angle optic 24 is preferably positioned along an exterior portion of a vehicle 12. Focusing lens 18 is preferably positioned interiorly of vehicle 12 from wide angle lens group 16 such that inner surface 26b of inner wide angle optic 26 is approximately 8 mm to 25 mm from outer surface 40a of optical filter 40 along optic path 25. Most preferably, this separation distance is approximately 16.00 mm. Image capture device 20 may then be positioned inwardly of focusing lens 18. Preferably, focusing lens 18 provides a focal distance from inner surface 34b of inner optic 34 to image capture device 20 of approximately 4.0 mm to 10.0 mm. Additionally, focusing lens 18 preferably provides an effective focal length range of approximately 1.6 mm to 2.1 mm.

Preferably, focusing lens 18 functions to focus an image corresponding to a field of view of approximately 50 degrees. Wide angle lens 16 functions to refract a wide angle field of view of approximately 170 degrees toward receiving end 18a of focusing lens group 18, such that focusing lens group 18 may focus and correct for distortions and other aberrations within the refracted image, thereby providing image capture device 20 with a focused image representing a wide angle field of view. Because wide angle lens 16 and positive lens group 18 are preferably formed from polycarbonate and/or acrylic materials, the diffractive elements and other surface curvatures may be easily and inexpensively formed in the molding processes, thereby allowing the imaging system to be inexpensively manufactured with a minimal number of optic elements, in contrast to the ten or more expensive glass or precision optic elements required in conventional systems.

Image capture device 20 receives the focused image from focusing lens 18. Although various camera devices may be utilized, a pixelated-imaging array is preferred for image capture device 20. An example of such an imaging array is a CMOS imaging array or the like, a detailed description of which is disclosed in the above referenced U.S. Pat. Nos. 5,550,677 and 5,670,935, issued to Schofield et al. However, other devices such as a CCD or a MOS may also be used. The preferred image capture device 20 is thus a low cost camera device, yet still provides an effective means for receiving the image. Image capture device 20 may be fixedly secured within the rear panel or other panels of vehicle 12, or may be movable, such as by a joystick or the like, to provide the driver with a different view point if desired. Furthermore, the image capture device may include a remotely operable zoom lens and/or variable focus or the like. Alternatively, the camera may be fixed, while the ability to pan or zoom within the wide field of view captured by the image capture device may be provided by electronic image processing of the image displayed to the driver. Image capture device 20 may also be connected to an image recording system to allow the driver to record the events occurring rearward of the vehicle. Additionally, the image capture device 20 may also measure the contrast ratio of the exterior scene to determine when visibility conditions change around the vehicle. The imaging system may then provide a warning to the driver to slow down as visibility decreases. The warning may be provided in the display or elsewhere within vehicle 12 as a visual or audio communication. Because drivers tend to drive faster as the scenic information becomes less visible, since they lose reference to ground movements and cannot readily discern how fast they are driving, such a warning system reduces the likelihood that the driver will increase the speed of the vehicle as conditions worsen.

The signal from image capture device 20 to display 22 may be communicated over any form of transmission including fiber optic cables or the like. Display 22 is preferably positioned within vehicle 12 for easy viewing of the display by the operator of vehicle 12. The display may be a liquid crystal display (LCD) or the like, and displays an image as received from image capture device 20. Preferably, display 22 displays the image at a focal length that is forward of the vehicle passenger compartment, as disclosed in published PCT application, international publication WO 96/38319, published Dec. 5, 1996, the disclosure of which is hereby incorporated herein by reference.

Wide angle imaging system 10 may be rigidly mounted on a rear panel 13 of vehicle 12 and directed substantially rearward of vehicle 12. The imaging system may also be positioned in a recessed area of the rear panel where a license plate is secured. Furthermore, the system may be included within the housing of a license plate lamp, or within a license plate frame or holder, in order to ease an aftermarket application of the system. In a minivan, sport utility vehicle or the like, the imaging system may be positioned within or immediately adjacent to the rim molding of the rear window or back light.

Alternatively, the wide angle imaging system, or even a conventional lens and camera system, may be mounted within a rear spoiler of a vehicle. This location not only allows the system to receive an image immediately rearward of the vehicle, but also facilitates simplified installation of the system as an aftermarket device. Another embodiment of the present invention may position an outer wide angle lens or optic within a vehicle logo or badge on the rear panel of the vehicle. When reverse is engaged by the driver, a motorized drive may move the badge and the lens or system rearward to a position extending outward from the vehicle, in order to capture an exterior field of view from the vehicle. This orientation further protects the system when it is not in use and also allows the system to be moved substantially rearward or otherwise exteriorly when it is in use, so as to capture scenic information immediately rearward of the vehicle and even in a downward direction if so desired.

Because outer optic 24 is positioned toward an exterior 12a of vehicle 12 such that an outer surface 24a may be exposed to the elements outside of vehicle 12, outer surface 24a may be coated with a protective coating to protect outer optic 24 from deterioration or damage due to exposure to the elements. This protective coating preferably comprises an organic haricot, an inorganic haricot, or an organic/inorganic compound. Additionally, the protective coating may include ultra violet absorbers or stabilizers to protect outer optic 24 from UV radiation degradation. This coating or other additional coatings substantially reduces the susceptibility of the optic to abrasion and/or ultra violet degradation, thereby providing a substantially clear and durable glass-like appearance to outer optic 24. Preferably, the coating is of the type disclosed in commonly assigned EPC application number 98650039.5 for VEHICULAR COMPONENT ASSEMBLY WITH HARD COATED ELEMENT, published on Jan. 20, 1999 under publication number EP 0892209, the disclosure of which is hereby incorporated herein by reference. Outer optic 24 may also be heatable to defog or defrost its surfaces.

Outer optic 24 may therefore be formed by a glass or plastic and coated with an indium tin oxide (ITO) transparent conductor or a doped tin oxide, or may include a wire mesh or a conductive coating mesh. Furthermore, outer surface 24a may be coated with an anti-soiling or anti-wetting coating, such as a silicone material, which may provide either a hydrophobic or hydrophilic property to the optic. Although described as a polycarbonate or acrylic element, outer optic 24 may alternately be a crown glass element or the like without affecting the scope of the present invention.

The corrective refractive and diffractive elements of the present invention are positioned along the optic path between wide angle outer optic 24 and image capture device 20. Additional corrective elements may also be included to further correct color or distortion within the refracted image. Diffractive elements are preferably included to correct the color focusing within the refracted image. The diffractive element or elements may further include an aspheric refractive lens element attached thereto or on an opposite surface of the respective optic element to further correct for distortions and aberrations within the image. Preferably, these refractive lens elements may also be transparent plastic lens elements, having a varying width, such that the image passing through the refractive lens is refracted in varying degrees, corresponding to the magnitude of distortion in the image received by the refractive optics. Therefore, either by themselves, or in conjunction with image capture device 20, the refractive and/or diffractive optic elements function as a means for correcting distortions within the image.

It is further envisioned that the wide angle imaging system may include electronic image processing or distortion correction to further correct the image displayed on display 22. The distortion correction process may be performed by an image processing algorithm or by pixel distribution variation on image capture device and/or an associated display 22. Preferably, the system may display a vehicle reference, such as a front or rear bumper or side of the vehicle, depending on the location of the imaging system, as is seen outside the vehicle, so as to provide a sense of correctness to the image displayed to the driver. For example, an image processing algorithm may be provided which ensures that straight horizontal and/or vertical lines in the scenic information exteriorly of the vehicle are displayed as straight horizontal and/or vertical lines in the image displayed on display 22. Such processing allows the imaging system to implement the wide angle lens and still provide a substantially realistic display image to the driver.

Figure 1:
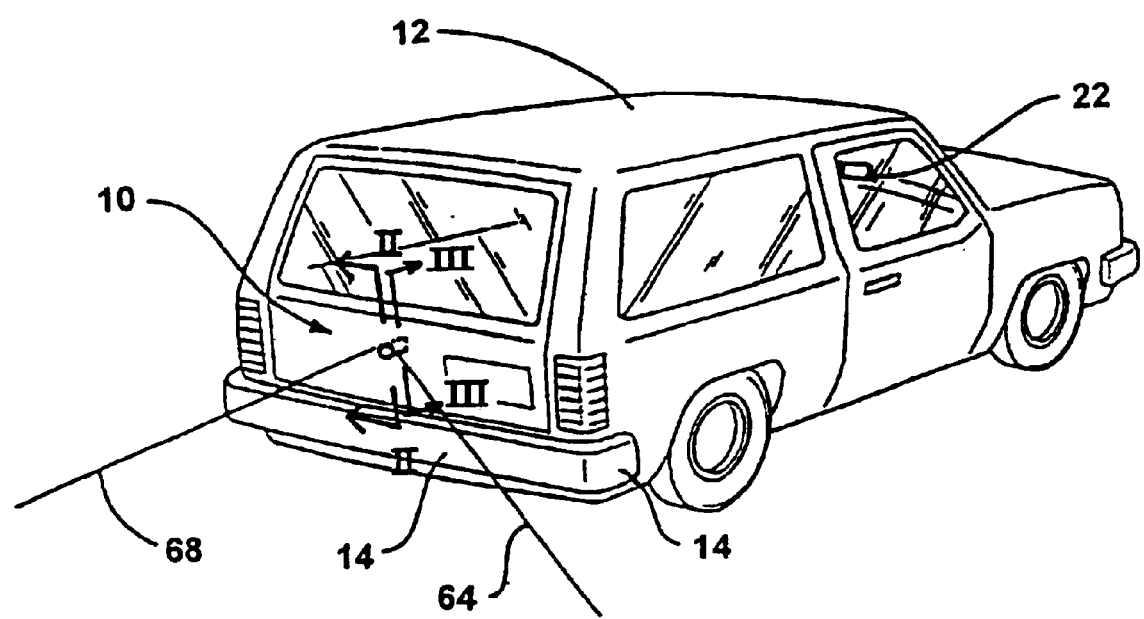
FIG. 1 is a rear perspective view of an automobile according to the invention.
Figure 3:
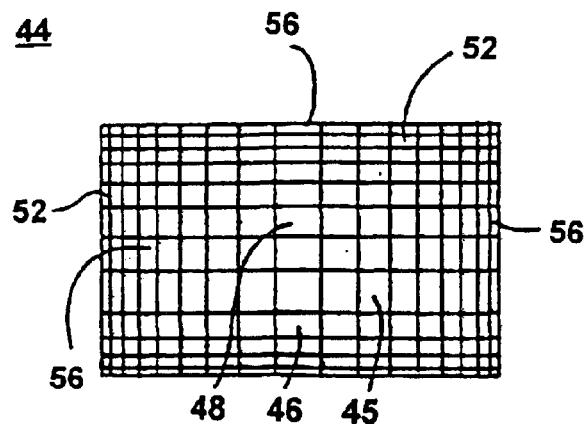
FIG. 3 is a view of a camera useful with the current invention taken along the line III—III in FIG. 1.

In an alternate embodiment, image capture device 20 may be capable of reducing distortion of the captured image. In the illustrated embodiment, this is accomplished by a non-uniform array 44 of electro-optic pixels 45, as shown in FIG. 3. Non-uniform array 44 has a coarse distribution of pixels 46 in a center region 48, while having a finer distribution of pixels 52 along the perimeter regions 56. This non-uniform pixelation of array 44 receives the focused image and varies correspondingly with the magnitude of distortion in the image refracted through the lenses 16 and 18. An example of non-uniform pixelated arrays is disclosed in commonly assigned U.S. Pat. No. 5,796,094, issued to Schofield et al., the disclosure of which is hereby incorporated herein by reference. The image received by non-uniform array 44 is then communicated to display 22, which includes a uniform array of display pixels (not shown), corresponding to non-uniform array 44, for simultaneously displaying the captured image. The combination of the non-uniform pixelation of array 44 and the uniform pixelation of display 22 has the effect of reducing distortion of the image as would be apparent to the skilled artisan. More particularly, center region 48 of non-uniform array 44 receives portions of the image that are refracted through center region 24d of outer wide angle optic 24, where the distortion is minimized. Conversely, the finer distribution of pixels 52 on non-uniform array 44 receive portions of the image having greater distortion, which are refracted through the outer edges 24e of outer optic 24 and represent an upper area, a lower area and side regions 64 and 68 (FIG. 1) of the scene rearward of vehicle 12. Therefore, when the finer pixel distribution 52 is communicated and synthesized onto the uniform array, the image received by finer pixels 52 is expanded, thereby correcting for the compressive distortion in these areas of the image. While this may require some interpolation between the finer pixels 52, the resultant image displayed to the vehicle operator has reduced distortion, especially in the critical areas, without extensive electronic processing of the image or requiring additional refractive lens elements. It should be understood that the distribution of pixels is selected to remove distortion from the particular refracted image and may be different for other optic designs.

Figure 4:
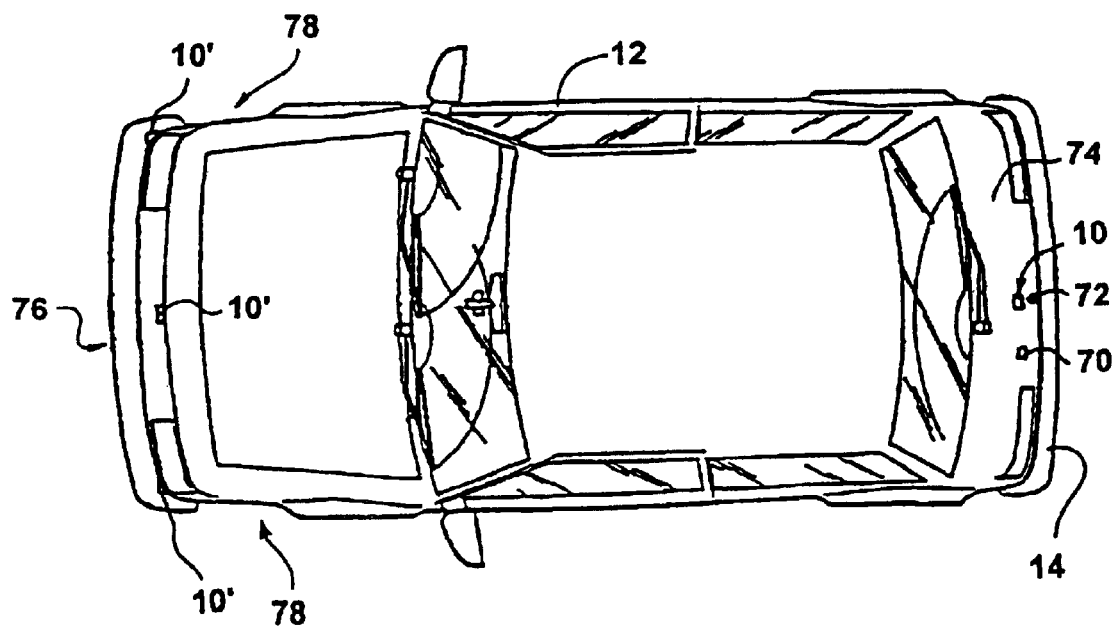
FIG. 4 is a top plan view of a vehicle incorporating alternate embodiments of the present invention.

Because it may be difficult for a driver to precisely judge distances between the vehicle and an object shown in the display 22, a ranging device 70 may be included in an imaging system (FIG. 4). The ranging device 70 measures the distance to an object positioned exteriorly of the vehicle and a signal may then be communicated to the driver regarding the proximity of the object. The ranging device may be ultrasonic, radar, stereo imaging or the like, with the distances measured being displayed on the display. Alternatively, the proximity of the object may be linked to the color or flashing of the display or an auxiliary display or to an intensity or rate of an audio signal or tone.

In order to provide the driver with scenic information when ambient lighting conditions are low, the imaging system may include a flood light or other illumination source 72 to provide illumination to the desired area (FIG. 4). The illumination source 72 may be an incandescent or non-incandescent light such as a solid state light emitting diode (LED), electro-illuminescent material or the like, and may provide visible light or near-infrared or non-visible infrared illumination. The image capture device may further include a material which is efficient in detecting near-infrared radiation.

Because visible rearward lighting may annoy drivers of other vehicles, the illumination source 72 preferably emits illumination in the near-infrared region, such as 0.7 microns to 2.5 microns of the electromagnetic radiation spectrum or beyond. Because this spectral region is not visible to human eyes, yet is received by imaging array sensors, this near-infrared illumination may provide visibility to image capture device 20 in low ambient lighting conditions while vehicle 12 is reversing, while avoiding potential annoyance of other drivers. Preferably, the illumination source 72 will only be activated at times when it is needed. For example, the illumination source may be locked out whenever the vehicle ignition is on, unless the reverse gear is also activated. Additionally, a photo-sensor control may be included in the wide angle imaging system to allow for activation of illumination source 72 only in low ambient light conditions. A photo-sensor may be positioned at various locations on or within the vehicle, such as, for example, on the image capture device itself. The output of the photo-sensor and the status of the reverse gear and/or vehicle ignition may be considered separately or in combination to determine whether the illumination source may be activated. Although discussed with respect to the low cost wide angle lens system of the present invention, application of illumination source 72 is not intended to be limited to such a system, and may alternatively be implemented with a conventional camera and lens system.

Although shown and described as a wide angle imaging system positionable within a rear panel 74 (FIG. 4) of vehicle 12, it is also envisioned that an imaging system 10' consistent with the present invention may be positioned along a forward portion 76 or side portion 78 of a vehicle. This would provide a wide angle view of the area immediately forward or to the side of the vehicle to an operator of the vehicle. Furthermore, additional lenses and image capture devices may be implemented to provide the operator with scenic information of these and other areas surrounding the vehicle. The operator may selectively operate the display to determine which scene may be displayed or the control may selectively operate the system in response to a driver or vehicle input.

A control device may also be provided to drive a configurable instrument panel within the vehicle. The control may be a track ball type device, or other manual control device such as a joystick, touchpad or the like, which allows the driver to easily manipulate a visual menu in the instrument panel or to change the display image. Alternatively, the control device may drive a voice menu, which allows the driver to navigate the menu by voice without taking the driver's attention from the road. The menu may include controls for a radio, cabin temperature or the like. It is further envisioned that such a device may also be implemented in a conventional camera and lens system.

Therefore, it is seen that a vehicular vision system is disclosed which comprises fewer components than a conventional lens system, thus facilitating compact packaging of the system. This results in a low-cost and light-weight system having only a minimal number of components, none of which are expensive glass lenses or the like, yet still providing a wide angle field of view to a vehicle operator. In particular, diffractive elements are included to provide optimal focusing of the colors on the image capture device. Additionally, aspheric, refractive lens elements are positioned along the optic path along with the diffractive elements to also correct for some of the distortion in the image before it is received by the image capture device. These corrective elements also minimize other aberrations within the image, such as coma and astigmatism.

In order to correct for the remaining distortion which may be present in the image as it is received by the image capture device, the image capture device may incorporate image distortion correction without implementing costly electronic processing devices and algorithms. The image capture device, which is preferably a CMOS imaging array or the like, may include an imaging array that is a non-uniform distribution of image capturing pixels. By receiving the distorted image on a non-uniform array, the image is then substantially corrected by electronically reproducing the captured image on a uniform array of the display of the present invention.

The wide angle imaging system of the present invention therefore provides a low cost system for providing information surrounding the vehicle, such as rearward scenic information of an area directly rearward of the vehicle, which requires fewer components than commercially available systems requiring ten or more precision optic elements. Furthermore, the components of the present invention are inexpensive and robust elements, thus further reducing the costs relative to conventional systems, while increasing the durability of the imaging system. An additional benefit is that the low cost plastic lenses also reduce the overall weight of the imaging system relative to the substantially heavier glass systems.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property right or privilege is claimed are defined as follows:

1. A vehicular vision system comprising:
    a wide angle lens group positionable on a portion of a vehicle for refracting a virtual image of an exterior view from the vehicle, thereby creating a wide angle refracted image, said wide angle lens group including an outer negative optic and an inner negative optic, said wide angle lens group comprising at least one of a polycarbonate and acrylic material;
    a focusing lens group which receives said refracted image and focuses the refracted image onto an image plane;
    an image capture device positioned on said image plane to receive the focused image from said focusing lens group, said wide angle lens group and said focusing lens group defining an optic path between an outer end of said wide angle lens group and said image capture device;
    an image distortion correction process whereby an image captured by said vision system is processed to correct distortion therein, said image distortion correction process being at least partially provided by a plurality of refractive optics, said wide angle lens group including at least one wide angle diffractive element positioned along said optic path, said wide angle diffractive element correcting color focusing of the refracted virtual image; and
    a display which displays a substantially non-distorted image of the scenic information, the non-distorted image being communicated from said image distortion process, wherein said wide angle diffractive element is on an outer surface of said inner negative optic, said wide angle diffractive element being defined by the equation:

$$\Phi = A_1 \rho^2 + A_2 \rho^4$$

where $\rho$ is a radial uperture coordinate divided by 1 mm, $A_1$ is a constant within a range of approximately 15 to 55 and $A_2$ is a constant within a range of approximately −0.01 to −0.5.

2. The vehicular vision system of claim 1, wherein said focusing lens group includes a refractive and diffractive lens element positioned along said optic path.

3. The vehicular vision system of claim 1, wherein said focusing lens group is constructed of one of polycarbonate and acrylic.

4. The vehicular vision system of claim 1, wherein said focusing lens group includes at least one diffractive element positioned along said optic path, said diffractive element correcting color focusing of the refracted image.

5. The vehicular vision system of claim 1, wherein $A_1$ is approximately 47.4149 and $A_2$ is approximately −0.1463.

6. The vehicular vision system of claim 1, wherein said outer surface of said inner negative optic has a radius of curvature in a range of approximately 20 mm to 60 mm.

7. The vehicular vision system of claim 6, wherein said outer surface of said inner negative optic has a radius of curvature of approximately 35.3824 mm.

8. The vehicular vision system of claim 6, wherein said inner negative optic has an inner aspheric surface opposite said outer wide angle diffractive element, said inner aspheric surface being defined by the following equation:

$$z = \frac{cy^2}{1 + \sqrt{1 - (1+K)c^2 y^2}}; c = \frac{1}{r_{xy}};$$

where x, y and z are coordinates on said inner aspheric surface along an x-axis, a y-axis and a z-axis, respectively, $r_{xy}$ is a radius of curvature to each point on said inner aspheric surface corresponding to an x coordinate and a y coordinate, and K is a conic constant within a range of approximately −1 to −20.

9. The vehicular vision system of claim 8, wherein K is approximately −13.3619.

10. The vehicular vision system of claim 8, wherein said outer negative optic has an outer surface and an inner surface, said outer surface of said outer negative optic having a radius of curvature of approximately 40 mm to 700 mm, said inner surface of said outer negative optic having a radius of curvature of approximately 20 mm to 40 mm, said inner surface of said outer negative optic being on a side toward said inner negative optic.

11. The vehicular vision system of claim 1, wherein said image distortion correction process is provided by said image capture device.

12. The vehicular vision system of claim 11, wherein said image capture device is a CMOS imaging array including a non-uniform array of pixels, said non-uniform array having a coarse distribution of said pixels in portions corresponding to the refracted image where there is minimal distortion and a fine distribution of said pixels in portions corresponding to the refracted image where there is greater distortion, the refracted image being received by said non-uniform pixels and communicated to a uniform array on said display, said display thereby receiving and displaying a uniform, substantially non-distorted image to the operator of the vehicle.

13. The vehicular vision system of claim 1, wherein said image distortion correction process is provided by electronic processing of the image received by said vision system.

14. The vehicular vision system of claim 1, wherein said outer negative optic comprises crown glass and said inner negative optic comprises one of polycarbonate and acrylic.

15. A vehicular vision system comprising:
    an image capture device having a field of view, said image capture device comprising a pixelated imaging array having a non-uniform array of pixels;
    a wide angle lens system disposed in front of said pixelated imaging array, said wide angle lens system including an outer negative optic and an inner negative optic, said wide angle lens system including at least one wide angle diffractive element, said at least one wide angle diffractive element correcting color focusing of the image;
    at least one focusing lens disposed between said wide angle lens system and said pixelated imaging array, said wide angle lens system and said at least one focusing lens defining an optic path, said image capture device capturing an image exterior of the vehicle; and
    a display, said display displaying a substantially non-distorted image in response to a signal output of said image capture device, wherein said wide angle diffractive element is on an outer surface of said inner negative optic, said wide angle diffractive element being defined by the equation:

$$\sigma = A_1\rho^2 + A_2\rho^4$$

where $\rho$ is a radial aperture coordinate divided by 1 mm, $A_1$ is a constant within a range of approximately 15 to 55 and $A_2$ is a constant within a range of approximately −0.01 to −0.5.

16. The vehicular imaging system of claim 15, wherein said non-uniform array of pixels has a coarse distribution of pixels in at least one portion of said non-uniform array corresponding to at least one portion of the image where there is minimal distortion.

17. The vehicular imaging system of claim 15, wherein said non-uniform array of pixels has a fine distribution of pixels in at least one portion of said non-uniform array corresponding to at least one portion of the image where there is greater distortion.

18. The vehicular imaging system of claim 15, wherein said non-uniform array of pixels has a coarse distribution of pixels in at least one portion of said non-uniform array corresponding to at least one portion of the image where there is minimal distortion and a fine distribution of pixels in at least one portion of said non-uniform array corresponding to as least one portion of the image where there is greater distortion.

19. The vehicular vision system of claim 15, wherein said image capture device comprises a CMOS imaging array.

20. The vehicular vision system of claim 15, wherein said wide angle lens system comprises at least one of a polycarbonate and acrylic material.

21. The vehicular vision system of claim 15, wherein said outer negative optic comprises crown glass and said inner negative optic comprises one of polycarbonate and acrylic.

22. The vehicular vision system of claim 15, wherein said at least one focusing lens is constructed of one of polycarbonate and acrylic.

23. The vehicular vision system of claim 15, wherein said at least one focusing lens includes a refractive lens element and a diffractive lens element.

24. The vehicular vision system of claim 15, wherein said at least one focusing lens includes at least one diffractive element, said at least one diffractive element correcting color focusing of the image.

25. The vehicular vision system of claim 24, wherein said wide angle lens system includes at least one wide angle diffractive element, said at least one wide angle diffractive element correcting color focusing of the image.

26. The vehicular vision system of claim 15, wherein said outer surface of said inner negative optic has a radius of curvature in a range of approximately 20 mm to 60 mm.

27. The vehicular vision system of claim 26, wherein said inner negative optic has an inner aspheric surface opposite outer angle diffractive element, said inner aspheric surface being defined by the following equation:

$$z = \frac{cy^2}{1 + \sqrt{1 - (1+K)c^2y^2}}; \quad c = \frac{1}{r_{xy}};$$

where x, y and z are coordinates on said inner aspheric surface along an x-axis, a y-axis and a z-axis, respectively, $r_{xy}$ is a radius of curvature to each point on said inner aspheric surface corresponding to an x coordinate and a y coordinate, and K is a conic constant within a range of approximately −1 to −20.

28. The vehicular vision system of claim 27, wherein said outer negative optic has an outer surface and an inner surface, said outer surface of said outer negative optic having a radius of curvature of approximately 40 mm to 700 mm, said inner surface of said outer negative optic having a radius of curvature of approximately 20 mm to 40 mm, said inner surface of said outer negative optic being on a side toward said inner negative optic.

29. A vehicular vision system comprising:

an image capture device having a field of view, said image capture device comprising a pixelated imaging array having a non-uniform array of pixels, said non-uniform array of pixels comprising a coarse distribution of pixels in at least one portion of said non-uniform array of pixels and a fine distribution of pixels in at least one other portion or said non-uniform array of pixels, said image capture device capturing an image exterior of the vehicle;

at least one lens disposed in front of said pixelated imaging array, said at least one lens comprising a wide angle lens group including an outer negative optic and an inner negative optic, said wide angle lens group including at least one wide angle diffractive element, said at least one wide angle diffractive element correcting color focusing of the image; and a display, said display displaying a substantially non-distorted image of the exterior scene to the operator of the vehicle in response to a signal output of said image capture device, wherein said wide angle diffractive element is on an outer surface of said inner negative optic, said wide angle diffractive element being defined by the equation:

$$\sigma = A_1\rho^2 + A_2\rho^4$$

where $\rho$ is a radial aperture coordinate divided by 1 mm, $A_1$ is a constant within a range of approximately 15 to 55 and $A_2$ is a constant within a range of approximately −0.01 to −0.5.

30. The vehicular imaging system of claim 29, wherein said non-uniform array of pixels has a coarse distribution of pixels in at least one portion of said non-uniform array of pixels corresponding to at least one portion of the image where there is minimal distortion.

31. The vehicular imaging system of claim 29, wherein said non-uniform array of pixels has a fine distribution of pixels in at least one other portion of said non-uniform array of pixels corresponding to at least one portion the image where there is greater distortion.

32. The vehicular imaging system of claim 29, wherein said non-uniform array of pixels has a coarse distribution of pixels in at least one portion of said non-uniform array of pixels corresponding to at least one portion of the image where there is minimal distortion and a fine distribution of pixels in at least one other portion of said non-uniform array of pixels corresponding to at least one portion the image where there is greater distortion.

33. The vehicular vision system of claim 29, wherein said image capture device comprises a CMOS imaging array.

34. The vehicular vision system of claim 29, wherein said at least one lens comprises at least one of a polycarbonate and acrylic material.

35. The vehicular vision system of claim 29, wherein said outer negative optic comprises crown glass and said inner negative optic comprises one of polycarbonate and acrylic.

36. The vehicular vision system of claim 29, wherein said outer surface of said inner negative optic has a radius of curvature in a range of approximately 20 mm to 60 nm.

37. The vehicular vision system of claim 36, wherein said inner negative optic has an inner aspheric surface opposite said outer wide angle diffractive element, said inner aspheric surface being defined by the following equation:

$$z = \frac{cy^2}{1+\sqrt{1-(1+K)c^2y^2}}; c = \frac{1}{r_{xy}};$$

when x, y and z are coordinates on said inner aspheric surface along an x-axis, a y-axis and a z-axis, respectively, $r_{xy}$ is a radius of curvature to each point on said inner aspheric surface corresponding to an x coordinate and a y coordinate, and K is a conic constant within a range of approximately −1 to −20.

38. The vehicular vision system of claim 37, wherein said outer negative optic has an outer surface and an inner surface, said outer surface of said outer negative optic having a radius of curvature of approximately 40 mm to 700 mm, said inner surface of said outer negative optic having a radius of curvature of approximately 20 mm to 40 mm, said inner surface of said outer negative optic being on a side toward said inner negative optic.

39. The vehicular vision system of claim 29, wherein said at least one lens includes at least one wide angle lens and at least one focusing lens, said at least one focusing lens being disposed between said at least one wide angle lens and said pixelated imaging array.

40. The vehicular vision system of claim 39, wherein said at least one focusing lens is constructed of one of polycarbonate and acrylic.

41. The vehicular vision system of claim 39, wherein said at least one focusing lens includes a refractive lens element and a diffractive lens element.

42. The vehicular vision system of claim 39, wherein said at least one focusing lens includes at least one diffractive element, said at least one diffractive element correcting color focusing of the image.

43. The vehicular vision system of claim 42, wherein said at least one wide angle lens includes at least one wide angle diffractive element, said at least one wide angle diffractive element correcting color focusing on the image.

* * * * *

UNITED STATES PATENT AND TRADEMARK OFFICE
CERTIFICATE OF CORRECTION

PATENT NO.       : 6,922,292 B2
APPLICATION NO.  : 10/614454
DATED            : July 26, 2005
INVENTOR(S)      : Brent J. Bos It is certified that error appears in the above-identified patent and that said Letters Patent is hereby corrected as shown below:

Column 7
Line 14, "(M)" should be --($\Phi$)--

Column 13
Line 46, "uperture" should be --aperture--

Column 15
Line 25, "as" should be --at--
Line 54, insert --said-- before "outer"

Column 16
Line 14, "or" should be --of--
Line 65, "nm." should be --mm.--

Column 17
Line 7, "when" should be --where--

Signed and Sealed this

Third Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 6,922,292 B2 Page 1 of 1
APPLICATION NO. : 10/614454
DATED : July 26, 2005
INVENTOR(S) : Brent J. Bos It is certified that error appears in the above-identified patent and that said Letters Patent is hereby corrected as shown below:

<u>Column 15</u>
Claim 27, Line 54, insert --wide-- before "angle"

Signed and Sealed this

Thirty-first Day of March, 2009

JOHN DOLL
*Acting Director of the United States Patent and Trademark Office*